United States Patent
Ceccatelli et al.

(10) Patent No.: US 12,052,054 B2
(45) Date of Patent: Jul. 30, 2024

(54) SECURITY SYSTEM

(71) Applicant: Telefonaktiebolaget LM Ericsson (publ), Stockholm (SE)

(72) Inventors: Riccardo Ceccatelli, Genoa (IT); Roberto Magri, Genoa (IT); Claudio D'Incà, Genoa (IT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 208 days.

(21) Appl. No.: 17/619,588

(22) PCT Filed: Jun. 27, 2019

(86) PCT No.: PCT/EP2019/067234
§ 371 (c)(1),
(2) Date: Dec. 16, 2021

(87) PCT Pub. No.: WO2020/259843
PCT Pub. Date: Dec. 30, 2020

(65) Prior Publication Data
US 2022/0303010 A1   Sep. 22, 2022

(51) Int. Cl.
*H04B 10/114* (2013.01)
*G08B 1/08* (2006.01)
*G08B 13/08* (2006.01)
*H04J 14/02* (2006.01)

(52) U.S. Cl.
CPC ......... *H04B 10/1149* (2013.01); *G08B 13/08* (2013.01); *H04J 14/0282* (2013.01); *G08B 1/08* (2013.01)

(58) Field of Classification Search
CPC ...... H04B 10/1149; G08B 13/08; G08B 1/08; H04J 14/0282
USPC .......................................................... 398/172
See application file for complete search history.

(56) References Cited

U.S. PATENT DOCUMENTS

| | | | | |
|---|---|---|---|---|
| 9,490,929 B2* | 11/2016 | Badinelli | ............ | G02B 6/4469 |
| 11,519,758 B2* | 12/2022 | Ogura | ................ | G08B 21/18 |
| 2008/0304825 A1* | 12/2008 | Mahony | ................ | H04B 10/03 |
| | | | | 398/38 |
| 2009/0040046 A1* | 2/2009 | Browning, Jr. | ........ | G08B 13/08 |
| | | | | 340/552 |

(Continued)

FOREIGN PATENT DOCUMENTS

| | | | | |
|---|---|---|---|---|
| EP | 3468217 A1 | 4/2019 | | |
| GB | 2598583 A | * 3/2022 | ............ | G06F 21/62 |

(Continued)

*Primary Examiner* — Abbas H Alagheband
(74) *Attorney, Agent, or Firm* — Weisberg I.P. Law, P.A.

(57) ABSTRACT

There is provided a security system for use at an enclosure containing one or more passive components of an optical communication link. The security system comprises a sensor configured to detect a physical breach of the enclosure, and an optical alert signal generator coupled to the optical communication link. The optical alert signal generator is self-powered, and configured to generate an optical alert signal and transmit the optical alert signal through the optical communication link when a physical breach of the enclosure is detected by the sensor. The optical alert signal is detectable at an entity external to the enclosure and connected to the optical communication link.

18 Claims, 6 Drawing Sheets

(56) References Cited

U.S. PATENT DOCUMENTS

| | | | |
|---|---|---|---|
| 2009/0174561 A1* | 7/2009 | Liu | H04B 10/272 340/578 |
| 2011/0241881 A1* | 10/2011 | Badinelli | G02B 6/4469 340/541 |
| 2012/0288273 A1* | 11/2012 | Pohlmann | H04Q 11/0067 398/9 |
| 2014/0091929 A1* | 4/2014 | Murphy | G08B 13/186 340/541 |
| 2014/0153889 A1* | 6/2014 | Murphy | G02B 6/44 385/134 |
| 2019/0259259 A1* | 8/2019 | Mullins | G08B 13/19682 |

FOREIGN PATENT DOCUMENTS

| | | | | |
|---|---|---|---|---|
| JP | H03210699 A | | 9/1991 | |
| JP | H08111665 A | * | 10/1994 | C04B 35/64 |
| KR | 20050092096 A | * | 9/2005 | |
| WO | 2014184178 A1 | | 11/2014 | |
| WO | WO-2014184178 A1 | * | 11/2014 | G01D 5/264 |
| WO | WO-2014198298 A1 | * | 12/2014 | H04B 10/0705 |
| WO | WO-2017204122 A1 | * | 11/2017 | E02D 29/1481 |

\* cited by examiner

SECURITY SYSTEM

TECHNICAL FIELD

The present disclosure relates to the field of security systems. In particular, the present disclosure relates to the field of security systems for use at enclosure containing one or more passive components of an optical communication link.

BACKGROUND

With the massive diffusion of Fibre to the Home (FTTH) and Fibre to the Cabinet (FTTC) technology, Internet of Things (IoT), and mobile networks (especially 4G and 5G), there is an increased demand for suitable enclosures in which passive elements (e.g. optical filters, splitters, or splice cassettes) can be fitted. Typically, these enclosures are located in manholes and handholes distributed across town in outdoor sites and most of these sites are not connected to an electrical power supply or a separate communication link. Also, these sites are usually easily and publicly accessible (e.g. from the street). Therefore, the enclosures may be vulnerable to security breaches including tampering of information, such as malicious monitoring or spying.

There are a number of different methods currently available for enhancing security of an enclosure (e.g. a cabinet at an outdoor location). One of the currently available methods involves strengthening or reinforcing the enclosure mechanically, so as to make it more difficult to physically breach the enclosure. However, there are a number of problems with such approach, including increased manufacturing and maintenance costs due to the materials required for making these enclosures, as well as undesired impact on serviceability. Another method involves installing a lock at the enclosure, but this would require the use and safekeeping of keys by operators which would make carrying out maintenance inconvenient, especially with large number of operators and frequent user turnover. Moreover, nowadays the use of locks does not in fact guarantee much in terms of security, as many types of locks can be relatively easily unlocked, breached, or broken.

An improved security system is required that addresses one or more of these problems. In particular, it would be advantageous to provide an improved security system for use at enclosure containing one or more passive components of an optical communication link.

SUMMARY

One aspect of the present disclosure provides a security system for use at an enclosure containing one or more passive components of an optical communication link. The security system comprises a sensor configured to detect a physical breach of the enclosure, and an optical alert signal generator coupled to the optical communication link. The optical alert signal generator is self-powered, and is configured to generate an optical alert signal and transmit the optical alert signal through the optical communication link when a physical breach of the enclosure is detected by the sensor. The optical alert signal is detectable at an entity external to the enclosure and connected to the optical communication link.

Another aspect of the disclosure provides a method of controlling a security system, wherein the security system is for use at an enclosure containing one or more passive components of an optical communication link. The method comprises: detecting a physical breach of the enclosure; and generating an optical alert signal and transmitting the optical alert signal through the optical communication link when a physical breach of the enclosure is detected, wherein the optical alert signal is detectable at an entity external to the enclosure and connected to the optical communication link.

Another aspect of the disclosure provides a non-transitory computer readable medium, comprising instructions which, when executed on at least one processor, causes the at least one processor to carry out the method as described herein.

BRIEF DESCRIPTION OF THE DRAWINGS

For a better understanding of examples of the present invention, and to show more clearly how the examples may be carried into effect, reference will now be made, by way of example only, to the following drawings in which.

DETAILED DESCRIPTION

Figure 1:
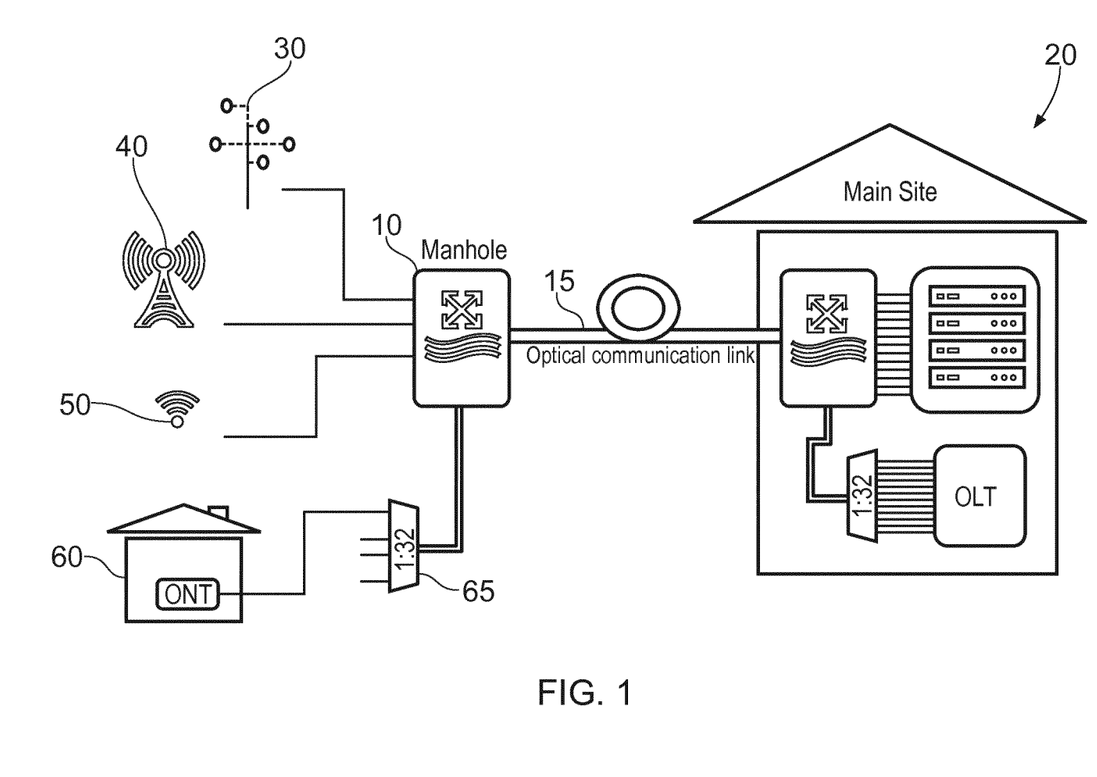
FIG. 1 is a schematic diagram of a wavelength-division multiplexing (WDM) network, according to embodiments of the disclosure.

FIG. 1 is a schematic diagram illustrating a wavelength-division multiplexing (WDM) network. The illustrated network in this drawing comprises an enclosure 10, a main site 20, an optical communication link 15 between the enclosure 10 and the main site 20, a plurality of radio communication units 30 and 40, a plurality of wireless communication units 50, and a plurality of optical network terminals 60. The optical communication link 15 is a WDM optical link in this embodiment, and in an alternative embodiment may use one or more different wavelengths.

As shown in the diagram of FIG. 1, component(s) contained in the enclosure 10 and component(s) located at the main site 20 are connected via the optical communication link 15. Furthermore, each of the plurality of radio communication units 30 and 40, the plurality of wireless communication units 50, and the plurality optical network terminals 60 are respectively connected to the one or more passive components (not illustrated in this drawing) contained in the enclosure 10 via a plurality of sub-links. For example, the passive components may be optical filters, splitters, splice cassettes or other optical components not requiring an electrical power supply. As such, the enclosure 10 is not powered with electrical power. In addition, a splitting unit 65 is provided at the sub-link between components (s) contained in the enclosure 10 and the plurality of optical network terminals 60 for performing wavelength splitting in the corresponding connection.

The enclosure 10 defines an internal space for containing one or more passive components, such as a splitting unit (one similar to the splitting unit 65 shown in the drawing) or a filter unit. The enclosure 10 may be positioned at an outdoor location, such as inside a manhole or a handhole at a public location. At the main site 20, a plurality of network components may be provided, such as passive optical network (PON) optical line terminals (OLTs) and baseband units (BBUs). According to some embodiments of the disclosure, a security system may be provided at the enclosure 10. Moreover, in some of these embodiments, additional components of the security system may be provided at the main site 20. Detailed description of the components contained in the enclosure 10 and at the main site 20 is provided below with reference to FIG. 2 and FIG. 3 respectively.

Figure 2:
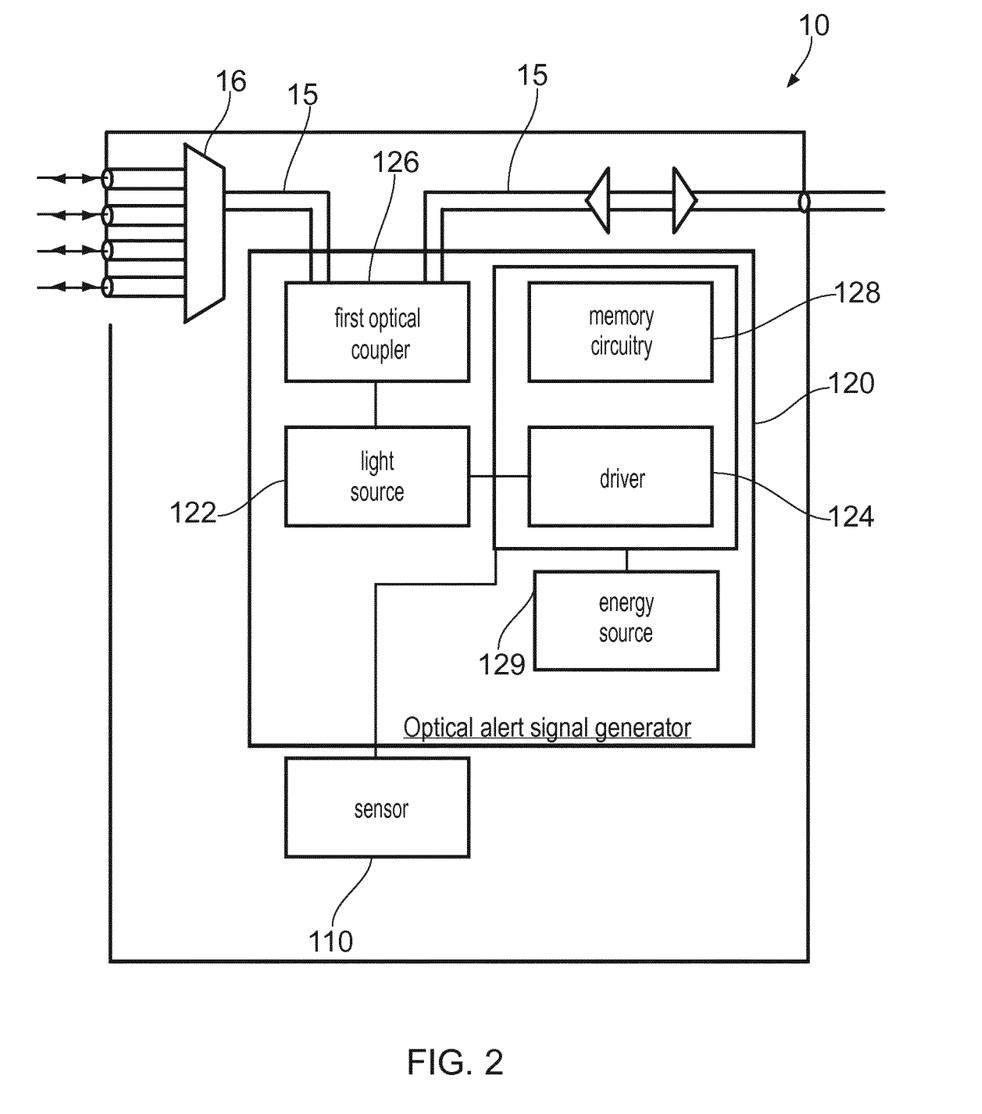
FIG. 2 is a block diagram of the enclosure in the WDM network of FIG. 1, according to embodiments of the disclosure.

FIG. 2 is a block diagram of the enclosure 10 in the WDM network of FIG. 1, according to embodiments of the disclosure. At the enclosure 10, there is provided a sensor 110 and an optical alert signal generator 120. According to the embodiments of this disclosure, the sensor 110 and the optical alert signal generator 120 may form a security system or at least a part of a security system for use at the enclosure 10. For example, in some embodiments, the sensor 110 and the optical alert generator 120 may be employed as a standalone security system suitable for use at the enclosure 10 or a similar enclosure which contains one or more passive components of an optical communication link. In some embodiments, additional components (e.g. a signal detector, which will be described in further detail with reference to FIG. 3) may be included in the security system, together with the sensor 110 and the optical alert signal generator 120.

The sensor 110 is configured to detect a physical breach of the enclosure. In some embodiments, the sensor 110 may comprise, for example, at least one of a motion sensor and a contact sensor. Since unforeseen motion or contact may indicate a physical breach of the enclosure depending on an environment and/or a location at which the enclosure is positioned, the motion sensor and/or the contact sensor may be configured with appropriate sensing parameters to detect unwanted and unintended intrusion events including physical tampering of the enclosure 10.

As illustrated in FIG. 2, the optical alert signal generator 120 comprises a light source 122, a driver 124, a first optical coupler 126, a memory circuitry 128, and an energy source 129. The optical alert signal generator 120 is self-powered and coupled to the optical communication link 15 via the first optical coupler 126. Specifically, the first optical coupler 126 is configured to couple the optical alert generating unit 120 to a part of the optical communication link that is contained within the enclosure 10.

The optical alert generator 120 is configured to generate an optical alert signal and transmit the optical alert signal through the optical communication link 15 when a physical breach is detected by the sensor 110. As such, the alert signal is transmitted on the optical network which it is protecting. The optical alert signal generated by the optical alert generator 120 is detectable at an entity external to the enclosure 10 and connected to the optical communication link 15, for example at the main site 20 in the WDM network as illustrated in FIG. 1. In the illustrated embodiment, the optical alert signal is a coded light signal, and at least some of the functionalities of the optical alert signal generator 120 as mentioned above is realised by the light source 122, the driver 124, the first optical coupler 126, the memory circuitry 128, and the energy source 129. The coding refers to a modulation sequence, i.e. a predetermined sequence of symbols. The coding of the light signal identifies the light signal as an alarm. For example, the coding may indicate a generic alarm, an alarm specific to a breach of an enclosure or an alarm which is specific to an area or the particular enclosure.

In more detail, the light source 122 is configured to emit light and the driver 124 is configured to drive the light source 122 upon receiving energy such that the light source 122 emits the coded light signal based on a modulation signal. This modulation signal, which is for modulating the light emitted by the light source 122 on a predetermined frequency, may be stored in the memory circuitry 128 (e.g. an electrically erasable programmable read-only memory (EEPROM) or a non-programmable memory circuit, etc.). This predetermined frequency may be a frequency not used for transmission of data traffic. For example, in the case of a Dense Wavelength Division Multiplexing (DWDM) network transmission in which the optical communication link uses a C-Band optical spectrum (i.e. 1,430-1,565 nm), the predetermined frequency may be a "grey" frequency outside the C-Band. Thus, the optical alert signal (e.g. coded light signal) can be transmitted via the optical communication link 15 without disturbing the normal channel transmissions in the optical network. Additionally or alternatively, in some embodiments, the coded light signal may be generated in a low rate (i.e. in the range of 10-1,000 Hz) so as to improve the detectability of the coded light signal and allow the use of cheaper circuitry components in the generation and detection of the coded light signal. In some embodiments, the light source 122 may be a laser (device), and may have a predetermined operating parameter suitable for use with the optical communication link 15.

As described above, the memory circuitry 128 is configured to store the modulation signal for modulating the light emitted by the light source 122. In addition, in some embodiments, the memory circuitry 128 can also be configured to store program code that can be executed by the driver 124 to perform the functionalities of the security system as described herein, for example the operation of the controller as described below.

As described above, the first optical coupler 126 is configured to couple the optical alert generating unit 120 to a part of the optical communication link that is contained within the enclosure 10. In the present embodiment, the first optical coupler 126 is more specifically configured to couple, in the enclosure 10, the light source 122 to the optical communication link 15. Thus, the coded light signal from the light source 122 can be coupled into the optical communication ink 15 for transmission to the entity external to the enclosure 10, e.g. the main site 20 in the WDM network as illustrated in FIG. 1. The first optical coupler 126 is configured to provide a small or minimal effect on the wavelengths transmitted between the main site and the units 30, 40, 50 or terminals 60. In some embodiments, the first optical coupler 126 may be configured to attenuate the light transmitted between the main site and the units 30, 40, 50 or terminals 60, such that e.g. at least 90% or 95% or more of the optical power which is transmitted between the main site and the units 30, 40, 50 or terminals 60 bypasses the light source 122. This provides for disturbance to the normal channel transmissions in the optical network to be minimised. In more detail, as the implementation of an optical coupler (such as the first optical coupler 126) typically introduces an insertion loss, by configuring the first optical coupler 126 to attenuate the light transmitted between the main site and the units 30, 40, 50, or terminals 60 in a 95:5 (or a ratio close to 95:5), the coded light signal from the light source 122 can be transmitted to the entity external to the enclosure with minimised impact on the transmission between the main site and the units 30, 40, 50 or terminals 60.

The energy source 129 is configured to provide energy to the driver 124 when a physical breach of the enclosure 10 is detected by the sensor 110. In embodiments where the light source 122 is a laser (device), the energy source 129 may only be required to provide a minimal amount of energy, i.e. sufficient amount of energy to drive the laser for at least a few seconds to emit the coded laser light signal. Accordingly, the optical alert signal generator is self-powered, i.e. having its own energy source and does not require an external energy supply to operate.

In some embodiments, the energy source 129 may be a battery, and in these embodiments the security system may further comprise a controller (not shown in the drawing). The controller may be configured to control the energy source 129 to provide energy to the driver 124 upon detection of a physical breach of the enclosure by the sensor 110. In this case, the activation of the driver (and therefore the subsequent emission of the coded light signal) is triggered by the detection of the physical breach and via the control of the controller.

Alternatively, in some embodiments, the sensor 110 and the energy source 129 may be implemented as an energy converter that is configured to convert at least one of mechanical energy and light energy into electrical energy upon being triggered by a physical breach of the enclosure 10. In these embodiments, the energy converter may be regarded as the sensor 110 and the energy source 129. As this particular configuration allows a physical breach of the enclosure to be detected by way of triggering the release of elastic energy, a separate sensor is therefore not required or included in these embodiments. In some embodiments, the energy converter may comprise an elastic component (e.g. a spring) configured to release elastic energy upon being triggered by a physical breach of the enclosure and to convert the released elastic energy into electrical energy. In some embodiments, the energy converter may be configured to release mechanical energy upon being triggered by the opening of a door of the enclosure, and to convert the released mechanical energy into electrical energy.

The elastic component may be arranged at the enclosure 10 such that the elastic component is in a compressed state when the enclosure 10 is closed, and in a released state when the enclosure 10 is opened. An example of such arrangement will be explained in more detail below with reference to FIG. 5. With appropriate dimensioning and arrangement, the electrical energy converted from the elastic energy released by the elastic component of the energy converter would provide sufficient power for the driver 124 to drive the light source 122 to emit the coded light signal for at least a few seconds, even when taking into account of potentially low efficiency of energy conversion from elastic energy into electrical energy.

Alternatively or in addition to the use of an elastic component, the energy converter may comprise a photovoltaic cell configured to convert light energy into electrical energy. For example, when the breach causes external ambient light to enter the enclosure the photovoltaic cell can convert this ambient light into electrical energy. The use of a photovoltaic cell in the energy converter may be particularly effective in the case where the enclosure 10 is positioned somewhere with exposure to ambient light (as least during a physical intrusion attempt).

As shown in FIG. 2, there is also provided a splitting unit 16 (a passive component of the optical communication link 15) in the enclosure 10. The splitting unit 16 may be a fibre optic splitter in the context of a WDM network. Although the splitting unit 16 does not form part of the security system according to the present embodiment, it will be appreciated that in alternative embodiments the splitting unit 16 may be regarded as part of the security system. Similarly, other types of passive components (e.g. an optical filter unit) contained in the enclosure in alternative embodiments may also be regarded as part of the security system.

Those skilled in the art would appreciate that in alternative embodiments the optical alert signal generator may not necessarily comprise one or more of the light source, the driver, the first optical coupler, the memory circuitry, and the energy source. In some embodiments where the optical alert signal generator does not comprise a light source, the coded light signal may be generated based on an external light source. In some embodiments where the optical alert signal generator 120 does not comprise a (first) optical coupler, the optical alert signal generator may be coupled to the optical communication link via an external optical coupler which is not part of the security system and/or the optical alert signal generator. In some embodiments where the optical alert signal generator does not comprise a memory circuitry, one or more memory circuitries may be external to the optical alert signal generator, the security system, or the enclosure 10. For example, one or more memory circuitries may be part of another device. In some embodiments where the optical alert signal generator does not comprise an energy source, an energy source may be provided as a component of the security system, or provided as an external component (e.g. part of another device).

Figure 3:
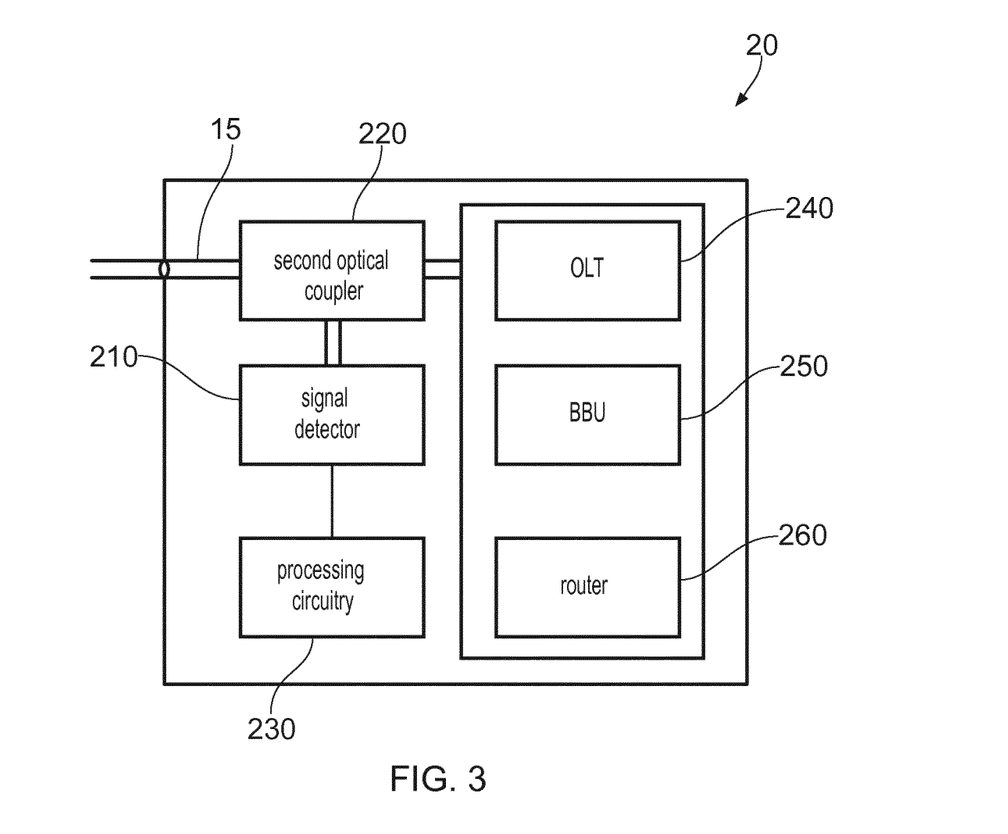
FIG. 3 is a block diagram of the main site in the WDM network of FIG. 1, according to embodiments of the disclosure.

FIG. 3 is a block diagram of the main site 20 in the WDM network of FIG. 1, according to embodiments of the disclosure. At the main site 20, there is provided a signal detector 210, a second optical coupler 220, a processing circuitry 230, an optical line terminal (OLT) 240, and for example, a baseband unit (BBU) 250, and a router device 260. The optical line terminal 240, the baseband unit 250, and the router device 260 are included in this context as examples of network equipment located in a main site of a typical WDM network, and it will be appreciated that in alternative embodiments the system may not comprise one or more of the optical line terminal 240, the baseband unit 250, or the router device 260.

As shown FIG. 3, the second optical coupler 220 is configured to couple the signal detector 210 to the optical communication link 15. In some embodiments, the signal detector 210, the second optical coupler 220, and the processing circuitry 230 may be regarded as additional components of the security system comprising the sensor 110 and the optical alert signal generator 120 as illustrated in FIG. 1. In more detail, the sensor 110 and the optical alert signal generator 120 may be regarded as the "alert transmission" side of the security system while the signal detector 210 and the second optical coupler 220 (with or without the processing circuitry 230) may be regarded as the "alert reception" side of the security system, with the "alert transmission" side being located to correspond to the enclosure 10 and the "alert reception" side being located to correspond to the main site 20.

As described above with reference to FIG. 2, the optical alert signal generated by the optical alert signal generator 120 can be transmitted via the optical communication link 15. In the present embodiment, this optical alert signal is received at the main site 20 via the optical communication link 15. As the optical alert signal reaches the main site 20, it would be coupled by the second optical coupler 220 to the signal detector 210 at which the optical alert signal can be detected.

In the illustrated embodiment, the processing circuitry 230 is connectable to a network management system and is configured to generate and transmit a notification to the network management system when the optical alert signal is detected by the signal detector 210. Thus, by way of generating, transmitting, and detecting the optical alert signal in the security system, the network management system can be promptly notified when there is a physical breach detected at the enclosure 10.

Those who are skilled in the art would appreciate that in some embodiments the security system may not comprise one or more of the signal detector, the second optical coupler, and the processing circuitry. In some embodiments where the security system does not comprise the signal detector, the transmitted optical alert signal from the optical alert signal generator may be detected by an entity external to the security system, for example a network management system including a suitable detection device. In some embodiments where the security system does not comprise the second optical coupler, the signal detector may be coupled to the optical communication link by way of an external optical coupler that is not part of the security system. In some embodiments where the security system does not comprise a processing circuitry, the result of the signal detector may be transmitted to an external device where a subsequent response is triggered (e.g. generation and transmission of a notification and/or a counteractive action such as redirection of traffic in the optical communication link/network).

Those who are skilled in the art would also appreciate that in alternative embodiments, the security system may comprise the network management system that is connected to the processing circuitry. In these alternative embodiments, the network management system of the security system may be configured to perform one or more counteractive actions upon receiving the notification from the processing circuitry which indicates that the optical alert signal is detected (and therefore a physical breach at the enclosure is detected). The one or more counteractive actions may comprise at least one of redirection of traffic in the optical communication link, redirection of traffic in the network of the optical communication link, and switching off the optical communication link in the network. In addition or alternatively, upon receiving the notification at the network management system, a user of the network management system may be prompted to arrange for an engineer to carry out an on-site inspection at the enclosure 10.

Although the security system is described in this disclosure as being for use at enclosure containing one or more passive components of an optical communication link in a WDM network, those skilled in the art would appreciate that the security system according to the embodiments of this disclosure is suitable for use at enclosures containing one or more passive components of optical communication link(s) in different types of optical networks.

Figure 4:
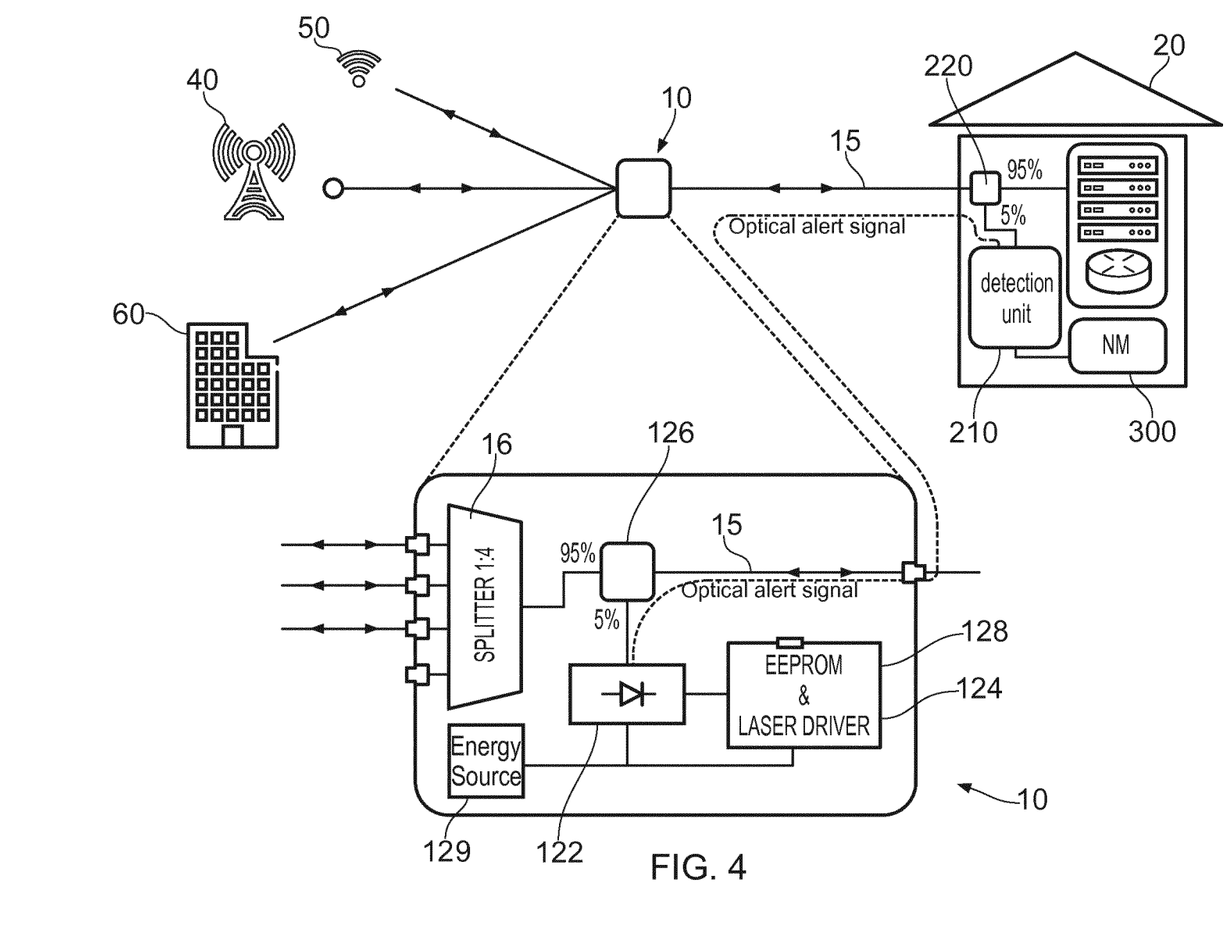
FIG. 4 illustrates the transmission of an optical alert signal in a WDM network, according to embodiments of the disclosure.

FIG. 4 shows the transmission of an optical alert signal in a WDM network, according to embodiments of the disclosure. The WDM network illustrated in FIG. 4 is similar to that illustrated in FIG. 1, and therefore the same reference signs will be used to denote the corresponding components shown in FIG. 4. Compared to FIG. 1, the main site 20 shown in FIG. 4 further comprises a network management system 300, and the part of the security system contained in the enclosure 10 is represented by a simplified diagram which omits some of the components described with reference to FIG. 2.

In FIG. 4, the light source 122 of the optical alert signal generator at the enclosure 10 is represented by a diode circuit symbol, while the driver 124 and the memory circuitry 128 of the optical alert signal generator are represented as a single entity. As an example, this entity may be a control circuit, e.g. comprising processing circuitry, for example, including an EEPROM and a laser driver. Furthermore, the first optical coupler 126 is shown to be arranged at the optical communication link 15, the first optical coupler 126 being configured to couple the light source 122 to the optical communication link 15 (with 95:5 in advantage of the main optical flux in the optical communication link 15 as indicated by the percentages shown in the drawing). In the present embodiment, a sensor configured to detect a physical breach of the enclosure 10 is also provided at the enclosure 10, although this component is omitted from FIG. 4 for simplicity.

At the main site 20, the second optical coupler 220 is shown to be arranged also at the optical communication link 15, the second optical coupler 220 being configured to couple the signal detector 210 to the optical communication link 15 (with 95:5 in advantage of the main optical flux in the optical communication 15 as indicated by the percentages shown in the drawing). In the present embodiment, the processing circuitry is omitted from the main site 20, and the signal detector 210 is connected to the network management system 300. Accordingly, in this embodiment the result of the signal detector 210 is directly received at the network management system 300. In this arrangement, the network management system 300 may be configured to perform one or more counteractive actions in response to the optical alert signal being detected by the signal detector 210, rather than in response to a notification generated and transmitted by a processing circuitry.

The transmission path of the optical alert signal is represented by the dotted line joining the light source 122 at the enclosure 10 and the signal detector 210 at the main site 20. As illustrated in the drawing, the optical alert signal originates from the light source 122 as the driver 124 receive energy from the energy source 129. The optical alert signal is then coupled into the optical communication link 15 via the first optical coupler 216 so that it can be transmitted in the upstream direction (i.e. towards the main site 20). Once the optical alert signal reaches the main site 20, it is coupled to the signal detector 210 at which it is detected. As mentioned in the paragraph above, the result of the signal detector 210 may then be transmitted to the network management system 300 which may then perform one or more counteractive actions.

As described with reference to FIG. 2, in some embodiments the energy converter of the optical alert signal generator in the security system may comprise an elastic component configured to release elastic energy upon being triggered by a physical breach of the enclosure and to convert the released elastic energy into electrical energy for use by the driver of the optical alert signal generator to drive the light source. As an example, the physical breach of the enclosure may be the opening or the breakage of the enclosure. To illustrate this example, FIG. 5 is a schematic drawing of an energy converter 130 of a security system according to embodiments of the disclosure.

Figure 5:
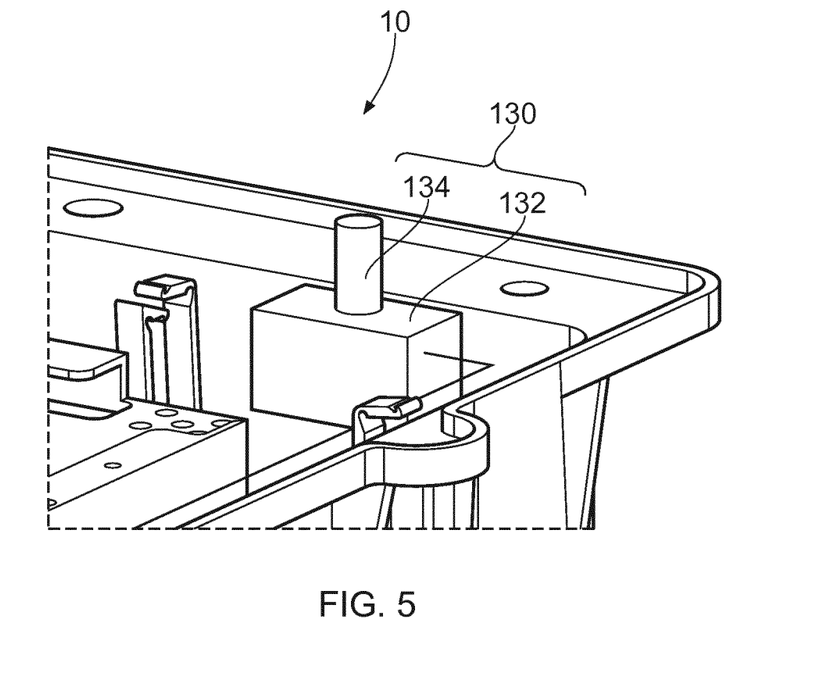
FIG. 5 is a schematic drawing of an energy converter of a security system according to embodiments of the disclosure.

In more detail, FIG. 5 shows an enclosure 10 in an opened state, with the internal space defined by the enclosure 10 being exposed through a top opening. Through the top opening of the enclosure 10, it is shown in the drawing that the energy converter 130 in the present embodiment is arranged adjacent to a top corner of the enclosure 10. The energy converter 130 comprises a housing 132 and an elastic component 134, the elastic component 134 being at least partially housed inside the housing 132.

In this illustrated embodiment, although not shown in the drawing, the elastic component 134 includes a spring which is arranged between a lower end of the elastic component 134 and an inner surface of the housing 132, the spring providing the elastic nature of the elastic component 134. Also not shown in the drawing is a flat covering element (e.g. a lid or a door) which is configured to securely engage with and cover the top opening of the enclosure 10 when the enclosure is in a closed state. Hence, when the enclosure 10 is in a closed state, the placement of the flat covering element at the top opening would push the elastic component 134 downwards and into the housing 132 and thus causing the spring arranged at the elastic component 134 to be compressed. When the enclosure 10 is in an opened state, the removal of the flat covering element from the top opening would allow the elastic component 134 to decompress and release the elastic energy stored which is instantaneously converted into electrical energy at the energy converter 130. This electrical energy can then be used for driving the driver of the optical alert signal generator of the security system. In this way, the energy converter provides both the functionality of the sensor, i.e. detecting a physical breach (opening of the enclosure/exposure of the internal space of the enclosure/removal of the flat covering element), and the functionality of the energy source, i.e. providing elastic energy which is then converted into electrical energy when the physical breach is detected, as described above with reference to FIG. 2.

Those who are skilled in the art would appreciate that the energy converter and/or the elastic component may adopt other forms and/or arrangements. For example, instead of using a spring, other types of elastic material (e.g. rubber) may be used for implementing the energy converter in the security system.

Figure 6:
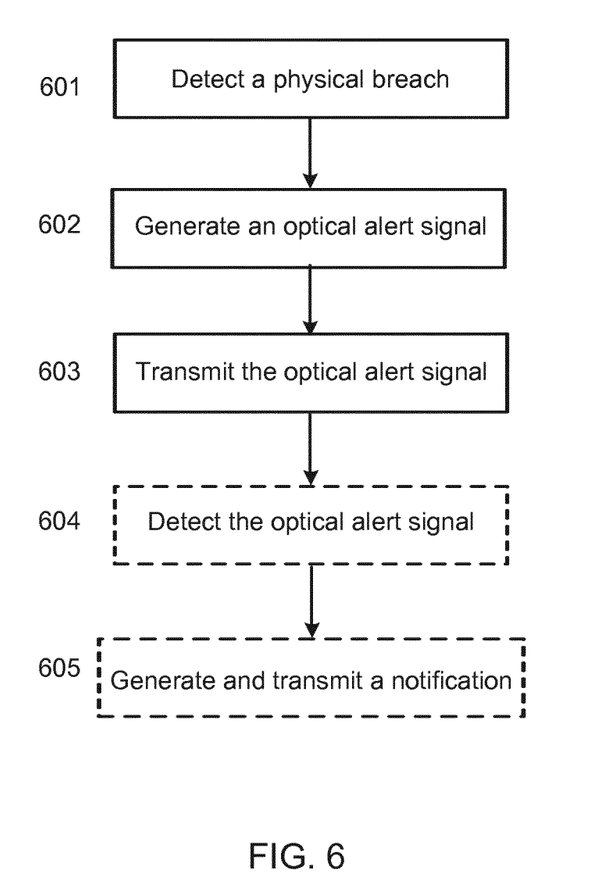
FIG. 6 is a flowchart illustrating a method of controlling a security system for use at an enclosure, according to embodiments of the disclosure.

FIG. 6 is a flowchart illustrating a method of controlling a security system for use at an enclosure, for example the security system described with reference to FIGS. 1 to 4, according to embodiments of the disclosure. The enclosure referenced in this illustrated method contains one or more passive components of an optical communication link, e.g. a communication link in a WDM network. The illustrated method can generally performed by or under the control of a processor, which may be provided as a controller in the security system or external to the security system as describe herein.

With reference to FIG. 6, at block 601, a physical breach of the enclosure is detected. The physical breach may be detected by a sensor, such as the sensor 110 as illustrated in FIG. 2. Upon detecting the physical breach of the enclosure, at block 602 an optical alert signal is generated. In some embodiments, the optical alert signal is generated by an optical alert signal generator, for example the optical alert signal generator 120 located at the enclosure 10 as illustrated in FIG. 2. At block 603, the optical alert signal generated at block 602 is transmitted. Specifically, the optical alert signal is transmitted through the optical communication link.

The optical alert signal generated at block 602 is detectable at an entity external to the enclosure and connected to the optical communication link, for example by the signal detector 210 at a remote site, e.g. the main site 20 as illustrated in FIG. 3. The detection of the optical alert signal is performed at block 604. Subsequently, upon the detection of the optical alert signal, a notification is generated and transmitted to a network management system at block 605.

Those who are skilled in the art would appreciate that in some embodiments the method steps illustrated in blocks 601 and 602 may be performed simultaneously. For example, in some embodiments an energy converter may be provided at the optical alert signal generator, which provides converted electrical energy upon being triggered by the physical breach for driving a light source to emit the optical alert signal. In addition, those who are skilled in the art would appreciate that in alternative embodiments the method steps illustrated in blocks 604 and 605 may be omitted. In these alternative embodiments, detection of the optical alert signal and/or generation and transmission of the notification may be performed at an external device which is not part of the security system.

Embodiments of the disclosure thus provide an effective system for providing security at an enclosure containing one or more passive components of an optical communication link. The security system is provided with a sensor for detecting a physical breach of the enclosure and a self-powered optical alert signal generator for generating and transmitting an optical alert signal when a physical breach is detected, the optical alert signal being detectable at an entity external to the enclosure and connected to the optical communication link. Thus, malicious access to the one or more passive components contained in the enclosure can be prevented. The solution proposed in this disclosure is suitable for enclosures located in unsupervised, unpowered, and wireless-shielded locations and requires no external energy source to operate. In addition, since a physical breach of the enclosure can be alerted using existing infrastructure (e.g. optical fibre link in a network), the security system is cost-effective and self-contained.

Embodiments of the disclosure also provide an apparatus comprising the security system as described herein, the apparatus further comprising the enclosure for containing the one or more passive components of an optical communication link.

There is also provided a computer program product comprising a computer readable medium, the computer readable medium having computer readable code embodied therein, the computer readable code being configured such that, on execution by a suitable computer or processor, the computer or processor is caused to perform the method or methods described herein. Thus, it will be appreciated that the disclosure also applies to computer programs, particularly computer programs on or in a carrier, adapted to put embodiments into practice. The program may be in the form of a source code, an object code, a code intermediate source and an object code such as in a partially compiled form, or in any other form suitable for use in the implementation of the method according to the embodiments described herein.

It will also be appreciated that such a program may have many different architectural designs. For example, a program code implementing the functionality of the method or system may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other.

An embodiment relating to a computer program product comprises computer-executable instructions corresponding to each processing stage of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

The enclosure 10 is described as not powered with electrical power. Alternatively, the enclosure 10 may be connected to a source of electrical power. The present disclosure still provides an advantage in that it is not necessary to connect the source of electrical power to the described components which provide the alarm signal.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The above disclosure sets forth specific details, such as particular embodiments or examples for purposes of explanation and not limitation. It will be appreciated by one skilled in the art that other examples may be employed apart from these specific details.

The invention claimed is:

1. A security system for use at an enclosure containing one or more passive components of an optical communication link, the security system comprising:
   sensor configured to detect a physical breach of the enclosure;
   an optical alert signal generator coupled to the optical communication link, the optical alert signal generator being self-powered and being positioned at a first location corresponding to the one or more passive components of the optical communication link, the optical alert signal generator being configured to:
      generate an optical alert signal when a physical breach of the enclosure is detected by the sensor; and
      transmit the optical alert signal through the optical communication link, wherein the optical alert signal is detectable at an entity external to the enclosure and connected to the optical communication link;
   a signal detector configured to detect the optical alert signal at the entity external to the enclosure;
   a second optical coupler configured to couple the signal detector to the optical communication link; and
   the signal detector and the second optical coupler being positioned at a second location corresponding to the entity external to the enclosure.

2. The security system according to claim 1, wherein the optical alert signal is a coded light signal, and wherein the optical alert signal generator comprises:
   a light source configured to emit light;
   a driver configured to drive the light source upon receiving energy, such that the light source emits the coded light signal based on a modulation signal; and
   a first optical coupler configured to couple, in the enclosure, the light source to the optical communication link, such that the coded light signal from the light source is coupled into the optical communication link for transmission to the entity external to the enclosure.

3. The security system according to claim 2, wherein the optical alert signal generator further comprises an energy source configured to provide energy to the driver when a physical breach of the enclosure is detected by the sensor.

4. The security system according to claim 3, wherein the energy source is a battery, and the security system further comprises a controller configured to control the energy source to provide energy to the driver upon detection of a physical breach of the enclosure by the sensor.

5. The security system according to claim 3, wherein the sensor and the energy source comprise an energy converter that is configured to convert at least one of mechanical energy and light energy into electrical energy upon being triggered by a physical breach of the enclosure.

6. The security system according to claim 5, wherein the energy converter comprises an elastic component configured to release elastic energy upon being triggered by a physical breach of the enclosure, and to convert the released elastic energy into electrical energy.

7. The security system according to claim 5, wherein the energy converter is configured to release mechanical energy upon being triggered by the opening of a door of the enclosure, and to convert the released mechanical energy into electrical energy.

8. The security system according to claim 5, wherein the energy converter comprises a photovoltaic cell configured to convert light energy into electrical energy.

9. The security system according to claim 1, wherein the optical alert signal generator further comprises memory circuitry configured to store a modulation signal for modulating the light emitted by the light source on a predetermined frequency.

10. The security system according to claim 9, wherein the predetermined frequency is a frequency not used for transmission of data traffic.

11. The security system according to claim 1, further comprising processing circuitry connectable to a network management system, wherein the processing circuitry is configured to generate a notification when the optical alert signal is detected by the signal detector and to transmit the notification to the network management system.

12. The security system according to claim 1, wherein the optical communication link is a wavelength-division multiplexing (WDM) optical link of a WDM network, and the entity external to the enclosure and connected to the optical communication link is accessible from a management system in the WDM network.

13. The security system of claim 1, wherein the enclosure defines an internal space for containing the one or more passive components, and wherein the sensor is configured to detect physical breach of the enclosure by detecting opening of or breaking of the enclosure, wherein opening of or breaking of the enclosure exposes the internal space of the enclosure.

14. The security system of claim 1, wherein the enclosure is a cabinet, wherein the sensor is configured to detect physical breach of the enclosure by detecting opening of or breaking of the cabinet.

15. A method of controlling a security system, wherein the security system is for use at an enclosure containing one or more passive components of an optical communication link, and wherein the method comprises:
- detecting a physical breach of the enclosure;
- at a first location corresponding to the one or more passive components of the optical communication link:
  - generating an optical alert signal when a physical breach of the enclosure is detected; and
  - transmitting the optical alert signal through the optical communication link, wherein the optical alert signal is detectable at an entity external to the enclosure and connected to the optical communication link; and
- detecting, at a second location corresponding to the entity external to the enclosure, the optical alert signal at the entity external to the enclosure.

16. The method according to claim 15, further comprising detecting, at the entity external to the enclosure and connected to the optical communication link, the optical alert signal.

17. The method according to claim 16, further comprising generating a notification when the optical alert signal is detected and transmitting the notification to a network management system.

18. A non-transitory computer readable medium, comprising instructions which, when executed on at least one processor of a security system, causes the security system to:
- detect a physical breach of an enclosure containing one or more passive components of an optical communication link;
- at a first location corresponding to the one or more passive components of the optical communication link:
  - generate an optical alert signal when a physical breach of the enclosure is detected; and
  - transmit the optical alert signal through the optical communication link, wherein the optical alert signal is detectable at an entity external to the enclosure and connected to the optical communication link; and
- detect, at a second location corresponding to the entity external to the enclosure, the optical alert signal at the entity external to the enclosure.

* * * * *